United States Patent [19]

Ohsawa et al.

[11] Patent Number: 4,804,568
[45] Date of Patent: Feb. 14, 1989

[54] ELECTROMAGNETIC SHIELDING MATERIAL

[75] Inventors: Toshiyuki Ohsawa, Tokyo, Japan; Yoshino Katsumi, 166-3 Obu-Cho, Kishiwadashi, Osaka-Fu 596, Japan; Keiichi Kanetou, Osaka, Japan

[73] Assignees: Ricoh Company, Ltd., Tokyo; Katsumi Yoshino, Osaka, both of Japan

[21] Appl. No.: 44,224

[22] Filed: Apr. 30, 1987

Related U.S. Application Data

[63] Continuation-in-part of Ser. No. 783,180, Oct. 2, 1985, abandoned.

[30] Foreign Application Priority Data

Oct. 3, 1984 [JP] Japan ................ 59-207650
Feb. 22, 1985 [JP] Japan ................ 60-032854
Mar. 26, 1985 [JP] Japan ................ 60-061262

[51] Int. Cl.[4] .............. B32B 7/12; C07D 207/323
[52] U.S. Cl. ..................... 428/40; 428/220; 428/356; 523/137
[58] Field of Search .............. 428/40, 220; 528/564

[56] References Cited

U.S. PATENT DOCUMENTS 4,401,545 8/1983 Naarmann et al. ............ 204/291
4,569,734 2/1986 Naarmann et al. ............ 204/78
4,582,575 4/1986 Warren et al. ................. 204/12

*Primary Examiner*—Alexander S. Thomas
*Attorney, Agent, or Firm*—Oblon, Fisher, Spivak, McClelland & Maier

[57] ABSTRACT

An electromagnetic shielding material comprising an electromagnetic shielding layer which comprises a pyrrole polymer complex consisting of (i) repeated pyrrole or pyrrole derivative monomer units which constitute the main chain of the polymer complex and (ii) aromatic anions bonded to the main chain.

10 Claims, 2 Drawing Sheets

ELECTROMAGNETIC SHIELDING MATERIAL

This application is a continuation-in-part of copending patent application Ser. No. 06/783,180, filed Oct. 2, 1985 abandoned.

BACKGROUND OF THE INVENTION

1. Field of the Invention

The present invention relates to an electromagnetic shielding material and more particularly to an electromagnetic shielding material comprising a pyrrole polymer complex consisting of (i) repeated pyrrole monomer units which constitute the main chain of the polymer complex and (ii) aromatic anions bonded to the main chain.

2. Discussion of the Background

In most recent electronic apparatus and devices, for instance, computers, IC and LSI are employed. From such apparatus and devices, electromagnetic waves are generated in the form of high frequency pulses and leak, having significant adverse effects on the peripheral equipment.

Conventionally, in order to prevent the leakage of such electromagnetic waves from such electronic apparatus and devices and to avoid the electromagnetic interference with the peripheral equipment, the following two methods are conventionally proposed.

The first method is a surface treatment method of forming an electroconductive thin layer on the surface of a plastic molded housing. The second method is a molding method of molding a plastic housing in which an electroconductive filler is dispersed. See, for example, the February 1986 issue of "Appliance."

The first method, however, has the shortcomings that (i) when metal plating is performed, the resins that can be employed with metal plating are limited to particular kinds of resins, (ii) when a metal-foil adhesive tape is applied to a housing, the applied housing becomes heavy, and (iii) when an electroconductive paint is employed, the coating thickness must be as great as 50 $\mu$m or more to form a uniform coated layer and a sufficient shielding effect for use in practice cannot always be obtained by such electroconductive painting.

In the second method, it is necessary to add about 30 wt.% to 40 wt.% of an electroconductive filler to the plastics for molding housings. The result is that the mechanically strong electromagnetic-shielded housings cannot be obtained.

Apart from the above, it is conventionally known that polymers having conjugated double bonds in the main chains, such as polyacetylene and polythiophene, can be made almost as electroconductive as metals by addition as dopant of an extremely small amount of impurities, such as $BF_4^-$, $BF_3$, Cl, Br and I. These polymers, however, are not stable when exposed to the air, since such dopants are easily released and therefore cannot maintain high electroconductivity for a long period of time. Furthermore, the mechanical strength of such polymers is insufficient for practical use. Therefore, these polymers cannot be employed in practice as electromagnetic shielding material.

SUMMARY OF THE INVENTION

It is therefore an object of the present invention to provide an improved electromagnetic shielding material from which the above-discussed conventional shortcomings have been eliminated, which is light in weight, has high mechanical strength and does not deteriorate in the air.

According to the present invention, the above object is achieved by an electromagnetic shielding material comprising an electromagnetic shielding layer which essentially consists of a pyrrole polymer complex which is prepared by electrochemical polymerization of pyrrole or a pyrrole derivative monomer in the presence of an aromatic anion salt. This shielding material comprises a pyrrole polymer complex consisting essentially of (i) repeating pyrrole or pyrrole derivative monomer units which constitute the main chain of the polymer complex, and (ii) aromatic anions bonded to the main chain. In this pyrrole polymer complex the ratio of monomer units to aromatic anions is about 3:1, and the dopant amount in this material, which is closely related to the monomer:anion ratio, is from 27% to 40%.

DETAILED DESCRIPTION OF THE PREFERRED EMBODIMENTS

An electromagnetic shielding material according to the present invention comprises an electromagnetic shielding material comprising a pyrrole polymer complex consisting of (i) repeating pyrrole or pyrrole derivative monomer units which constitute the main chain of the polymer complex and (ii) an unsubstituted or substituted aromatic anion bonded to the main chain. This pyrrole polymer complex is prepared by electrolytic polymerization of pyrrole or a pyrrole derivative and an unsubstituted or substituted aromatic anion. The pyrrole polymer complex can be worked into a film and can be applied to an appropriate support material if necessary when it is used in practice.

The pyrrole polymer complex for use in the present invention can be prepared by placing in an electrolytic vessel a solution of pyrrole or a pyrrole derivative and an unsubstituted or substituted aromatic anion salt dissolved in an appropriate solvent and subjecting the solution to electrolytic polymerization by anodic oxidation.

As pyrrole derivative monomers for use in the present invention, the following can be exemplified, although the pyrrole derivative monomers for use in the present invention are not limited to them:

3,4-alkyl (having 1 to 4 carbon atoms)-pyrrole, 3,4-aryl-pyrrole, and

3(or 1)-alkyl (having 1 to 4 carbon atoms)-4(or 3)-aryl-pyrrole.

In the electrolytic solution, it is preferable that the content of pyrrole or a pyrrole derivative be in the range of 0.02 mole/l to 1.00 mole/l, more preferably in the range of 0.10 mole/l to 0.30 mole/l. When the content is less than 0.02 mole/l, the film formation efficiency is reduced, while when the content is more than 1.00 mole/l, it is difficult to produce a uniform film.

As unsubstituted or substituted aromatic anions for use in the present invention, although a variety of aromatic anions can be employed, the following aromatic anions are preferable for use in the present invention: anions of aromatic sulfonic acids having the same or different substituents selected from the group consisting of hydrogen, a lower alkyl group (having 1 to 3 carbon atoms), a nitro group and a cyano group; anions of aromatic carboxylic acids having the same or different substituents selected from the group consisting of hydrogen, a lower alkyl group (having 1 to 3 carbon atoms), a nitro group and a cyano group; and metal complexes of the above aromatic acids. More specifically, anions of p-toluenesulfonic acid, o-toluenesulfonic acid, m-toluenesulfonic acid, benzenesulfonic acid, m-nitrobenzenesulfonic acid and p-nitrobenzenesulfonic acid are particularly preferable for use in the present invention.

Of the above anions, not only one anion, but also two or more anions can be contained in the polymer complex. Therefore, at least one anion is added in the form of a metal salt to the reaction. The counterpart cations are, for example, alkali metal cations such as cations of $Li^+$, $Na^+$ and $K^+$, ammonium cations such as $(Et)_4N^+$ and $(Bu)_4N^+$, and $H^+$.

It is preferable that the content of the aromatic anion metal salt in the electrolytic solution be in the range of 0.01 mole/l to 0.2 mole/l. When the content is less than 0.01 mole/l, the polymerization efficiency is reduced. When the content is more than 0.2 mole/l, undissolved electrolytes ar dispersed in the polymer film, so that the mechanical strength of the polymer film is significantly reduced.

As the solvent for use in preparation of an electromagnetic shielding material according to the present invention, the following polar solvents can be used: water, methanol, acetonitrile, benzonitrile, propylene carbonate, γ-butyl lactone, nitrobenezene, dioxane, dimethylformamide and acetone.

From the view point of the reactivity, it is preferable to use acetonitrile, benzonitrile and propylene carbonate. Furthermore, it is more preferable that such solvents be free from water in order to produce a pyrrole polymer complex which is uniform in quality and has high tensile strength when it is worked into a film.

As mentioned previously, the pyrrole polymer complex for use in the present invention can be prepared by placing in an electrolytic vessel a solution of pyrrole or a pyrrole derivative and an aromatic anionic salt dissolved in one of the above-mentioned solvents and subjecting the solution to electrolytic polymerization by anodic oxidation. When necessary, catalysts, for instance, catalysts for use in Friedel Crafts reaction, can be added to the above reaction mixture.

The structures and shapes of an electrolytic vessel and electrodes disposed in the vessel for use in the present invention can be chosen as desired. As the electrodes, for instance, conventionally employed rotary disc type electrodes, multi-layered type electrodes and electrodes with the anode and cathode thereof separated by a porous film made of glass or a polymeric material can be employed.

As the materials for constructing such electrodes, metals such as Au, Pt and Ni, and metal oxides such as $SnO_2$, $In_2O_3$ can be employed. Composite electrodes and coating electrodes by use of these metals and metal oxides are preferable for use in the present invention. In particular, when such metal oxides are employed as anode, a strong film of the polymer complex having high tensile strength can be obtained.

The electric current supplied in the course of the electrolytic reaction have significant effects on the reactivity, the uniformity of the polymer complex and the thickness of the polymer complex film. Therefore it is necessary to adjust the electric current in accordance with the required quality of the electromagnetic shielding material.

It is preferable that the electric current be not more than 5.0 mA since when the electric current is in this range, the proceeding of the polymerization reaction is smooth and the obtained polymer has high mechanical strength.

In the pyrrole polymer complex, the bonding state of the pyrrole monomer and the aromatic anion is not accurately known. According to the analysis conducted by the inventors of the present invention, it was determined that the pyrrole polymer complex consists of (i) repeated pyrrole monomer units which constitute the main chain of the polymer and (ii) the aromatic anion bonded to the main chain. The ratio of monomer units to anion units is about 3:1. The dopant amount which is closely related to the monomer:anion ratio can be between 27% and 40%, preferably between 30% and 40%.

By referring to the accompanying drawings, representative embodiments of an electromagnetic shielding material according to the present invention will now be explained.

Figure 1:
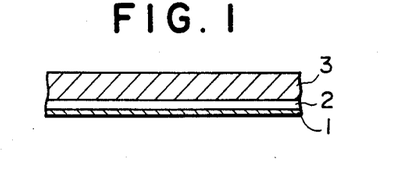
FIGS. 1 through 4 schematically show the cross-sectional views of tape- or film-type embodiments of an electromagnetic shielding material according to the present invention.
Figure 2:
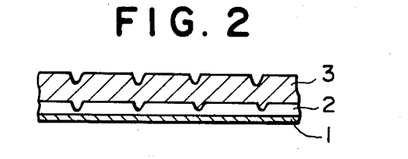

Each of the electromagnetic shielding materials shown in FIGS. 1 and 2 consists of a disposable backing sheet 1, an adhesive layer 2 and a pyrrole polymer complex layer 3. When these electromagnetic shielding materials are prepared, for instance, an adhesive agent such as an acryl emulsion is coated on the pyrrole polymer complex layer 3, so that the adhesive layer 2 is formed on the pyrrole polymer complex layer 3. The disposable backing sheet 1 is then attached to the adhesive layer 2, for instance by laminating, whereby an electromagnetic shielding material is prepared. The disposable backing sheet 1 can be peeled off the adhesive layer 2 when the electromagnetic shielding material is used.

Figure 3:
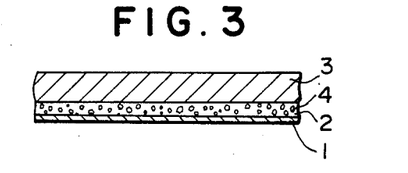

Referring to FIG. 3, there is shown another embodiment of an electromagnetic shielding material according to the present invention. This electromagnetic shielding material has the same structure as that of the shielding material shown in FIG. 1 except that an electroconductive filler 4, such as powder-like pyrrole black, finely-divided carbon particles and metal powder, is dispersed in the adhesive layer 2. The thus prepared electromagnetic shielding material has not only electromagnetic shielding effect, but also electrostatic shielding effect.

Figure 4:
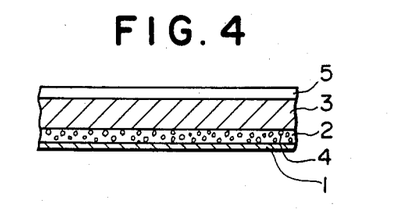

Referring to FIG. 4, there is shown still another embodiment of an electromagnetic shielding material according to the present invention. This electromagnetic shielding material has the same structure as that of the shielding material shown in FIG. 3 except that a protective layer 5 is further formed on the pyrrole polymer complex layer 3. By disposing the protective layer 5 on the pyrrole polymer complex layer 3, the preservability, flame resistance, folding endurance of the electromagnetic shielding material can be improved. Further, this shielding material also has not only electromagnetic shielding effect, but also electrostatic shielding effect as in the case of the electromagnetic shielding material shown in FIG. 3.

Figure 5:
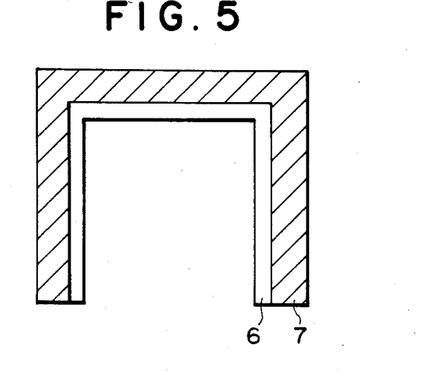
FIG. 5 schematically shows the cross-sectional view of a box-type embodiment of an electromagnetic shielding material according to the present invention.

Referring to FIG. 5, there is shown a further embodiment of an electromagnetic shielding material according to the present invention. This embodiment comprises a box-type reinforcement 6 and a pyrrole polymer complex layer 7 which is coated on the reinforcement 6. This box-type electromagnetic shielding material can be used as electromagnetic shielding box and the shape of the shielding material can be modified as desired in accordance with the application.

In the above embodiments, it is preferable that the thickness of the pyrrole polymer complex layer be 20 μm or more for obtaining high mechanical strength and high electromagnetic shielding effect.

By referring to the following examples, the preparation of pyrrole type polymer complexes for use in the present invention and the shielding effect thereof will now be explained:

Polymer Complex Preparation Example 1

A Nesa glass plate (an electroconductive glass on which indium tin oxide is deposited in vacuum on a glass plate as an electroconductive layer) serving as anode and a Ni plate serving as cathode were placed so as to face each other in an electrolytic vessel.

An electrolytic solution consisting of the following components was then placed in the electrolytic vessel:

| Pyrrole | 0.1 mole/l |
|---|---|
| p-toluenesulfonic acid | 0.05 mole/l |
| Acetonitrile | Balance amount |

Under the following conditions, anodic oxidation reaction was galvanostatically carried out, so that a pyrrole polymer complex layer No. 1 was formed on the Nesa glass plate:

| Electric current density: | 1.0 mA/cm$^2$ |
|---|---|

The properties of the pyrrole polymer complex layer formed under the above conditions were as follows:

| Thickness of the layer: | about 50 μm (20 C/cm$^2$) |
|---|---|
| Tensile strength: | 10,500 psi |
| Electric conductivity: | 90 S/cm |
| Doping Amount: | 35% |

The above doping amount means the amount of the aromatic anion per one pyrrole ring.

The above properties were respectively measured by the following devices or methods:

| Thickness of the layer: | Dektak Mark II Profilometer (made by Sloan Co.) |
|---|---|
| Doping amount: | Elemental Analysis |
| Electroconductivity: | Four Probe Method |
| Tensile strength: | Instron Mechanical Tester |

Polymer Complex Preparation Example 2

An electrolytic solution consisting of the following components was then placed in the same electrolytic vessel as that employed in Polymer Complex Preparation Example 1:

| Pyrrole | 0.2 mole/l |
|---|---|
| Sodium p-toluenesulfonate | 0.05 mole/l |
| Propylene carbonate | Balance amount |

Under the following conditions, anodic oxidation reaction was galvanostatically carried out, so that a pyrrole polymer complex layer No. 2 was formed on the Nesa glass plate:

| Electric current density: | 0.8 mA/cm$^2$ |
|---|---|

The properties of the pyrrole polymer complex layer formed under the above conditions were as follows:

| Thickness of the layer: | 23 μm (8 C/cm$^2$) |
|---|---|
| Tensile strength: | 7,800 psi |
| Electric conductivity: | 37 S/cm |
| Doping Amount: | 38% |

Polymer Complex Preparation Example 3

An electrolytic solution consisting of the following components was then placed in the same electrolytic vessel as that employed in Polymer Complex Preparation Example 1:

| Pyrrole | 0.2 mole/l |
|---|---|
| Sodium o-toluenesulfonate | 0.01 mole/l |
| Acetonitrile | Balance amount |

Under the following conditions, anodic oxidation reaction was galvanostatically carried out, so that a pyrrole polymer complex layer No. 3 was formed on the Nesa glass plate:

| Electric current density: | 0.3 mA/cm$^2$ |
|---|---|

The properties of the pyrrole polymer complex layer formed under the above conditions were as follows:

| Thickness of the layer: | 45 μm (18 C/cm$^2$) |
|---|---|
| Tensile strength: | 8,300 psi |
| Electric conductivity: | 40 S/cm |
| Doping Amount: | 34% |

Polymer Complex Preparation Example 4

An electrolytic solution consisting of the following components was then placed in the same electrolytic vessel as that employed in Preparation Example 1:

| Pyrrole | 0.1 mole/l |
|---|---|
| Tetra-butylammonium p-toluenesulfonate | 0.1 mole/l |
| Acetonitrile | Balance amount |

Under the following conditions, anodic oxidation reaction was galvanostatically carried out, so that a pyrrole polymer complex layer No. 4 was formed on the Nesa glass plate:

| Electric current density: | 2.0 mA/cm² |
|---|---|

The properties of the pyrrole polymer complex layer prepared under the above conditions were as follows:

| Thickness of the layer: | about 150 μm (63 C/cm²) |
|---|---|
| Tensile strength: | 11,000 psi |
| Electric conductivity: | 68 S/cm |
| Doping Amount: | 37% |

Comparative Polymer Complex Preparation Example 1

An electrolytic solution consisting of the following components was then placed in the same electrolytic vessel as that employed in Polymer Complex Preparation Example 1:

| Pyrrole | 0.2 mole/l |
|---|---|
| Tetra-butyl ammonium perchlorate | 0.1 mole/l |
| Nitrobenzene | Balance amount |

Under the following conditions, anodic oxidation reaction was galvanostatically carried out, so that a comparative pyrrole polymer complex layer No. 1 was formed on the Nesa glass plate:

| Electric current density: | 0.4 mA/cm² |
|---|---|

The properties of the comparative pyrrole polymer complex layer No. 1 were as follows:

| Thickness of the layer: | 18 μm (6 C/cm²) |
|---|---|
| Tensile strength: | 5,500 psi |
| Electric conductivity: | 28 S/cm |
| Doping Amount: | 33% |

Comparative Polymer Complex Preparation Example 2

An electrolytic solution consisting of the following components was then placed in the same electrolytic vessel as that employed in Polymer Complex Preparation Example 1:

| Pyrrole | 0.2 mole/l |
|---|---|
| Lithium tetrafluoroborate | 0.1 mole/l |
| Acetonitrile | Balance amount |

Under the following conditions, anodic oxidation reaction was galvanostatically carried out, so that a comparative pyrrole polymer complex layer No. 2 was formed on the Nesa glass plate:

| Electric current density: | 1.0 mA/cm² |
|---|---|

The properties of the comparative pyrrole polymer complex layer No. 2 were as follows:

| Thickness of the layer: | 22 μm (7 C/cm²) |
|---|---|
| Tensile strength: | 2,800 psi |
| Electric conductivity: | 28 S/cm |
| Doping Amount: | 33% |

Comparative Polymer Complex Preparation Example 3

An electrolytic solution consisting of the following components was then placed in the same electrolytic vessel as that employed in Preparation Example 1:

| Pyrrole | 0.2 mole/l |
|---|---|
| Lithium perchlorate | 0.1 mole/l |
| Acetonitrile | Balance amount |

Under the following conditions, anodic oxidation reaction was galvanostatically carried out, so that a comparative pyrrole polymer complex layer No. 3 was formed on the Nesa glass plate:

| Electric current density: | 2.0 mA/cm² |
|---|---|

The properties of the comparative pyrrole polymer complex layer No. 4 were as follows:

| Thickness of the layer: | 48 μm (20 C/cm²) |
|---|---|
| Tensile strength: | 3,300 psi |
| Electric conductivity: | 28 S/cm |
| Doping Amount: | 33% |

By referring to the following examples, embodiments of an electromagnetic shielding material according to the present invention will now be explained, which employs the above described pyrrole polymer complex layers:

EXAMPLE 1

On a pyrrole polymer complex film having a thickness of about 50 μm (0.34 g/cm²) prepared in Polymer Complex Preparation Example 1, an acryl resin adhesive agent (Aron Tack S-121 made by Toagosei Chemical Industry Co., Ltd.) was coated with a thickness of about 4 μm, so that an adhesive layer was formed on the pyrrole polymer complex film. The thus prepared pyrrole polymer complex film having the above adhesive layer was applied and fixed to an acrylic resin plate having a size of 150 mm × 150 mm and a thickness of 2 mm, whereby an electromagnetic shielding material sample No. 1 according to the present invention was prepared.

This sample was subjected to the measurement of the attenuation (dB) of the intensity of electric field in accordance with Takeda Riken Method (which is a generally employed method of measuring electric field shielding effect), whereby the electric field shielding effect of the sample was assessed.

In the Takeda Riken Method, the above sample was situated between an outgoing rod antenna and a receiving rod antenna which were spaced out 10 mm apart in a shielding box, and the attenuation of the intensity of the electric field (having a frequency ranging from 30 MHz to 300 MHz) was measured by use of a spectrum analyzer (Spectrum Analyzer TR 4172 made by Takeda Riken Co., Ltd.). The results are shown in Table 1.

EXAMPLE 2

Example 1 was repeated except that the pyrrole polymer complex film employed in Example 1 was replaced by the pyrrole polymer complex film having a thickness of 23 μm (0.16 g/cm$^2$) prepared in Polymer Complex Preparation Example 2, whereby an electromagnetic shielding material sample No. 2 according to the present invention was prepared.

The electromagnetic shielding material sample No. 2 was subjected to the same measurement of the attenuation (dB) of the intensity of electric field as in Example 1, so that the electric field shielding effect of the sample was assessed. The results are shown in Table 1.

EXAMPLE 3

Example 1 was repeated except that the pyrrole polymer complex film employed in Example 1 was replaced by the pyrrole polymer complex film having a thickness of 45 μm (0.31 g/cm$^2$) prepared in Polymer Complex Preparation Example 3 and carbon particles (having an average particle size of about 2.5 μm) were dispersed in an amount of about 30 wt.% in the adhesive layer, whereby an electromagnetic shielding material sample No. 3 according to the present invention was prepared.

The electromagnetic shielding material sample No. 3 was subjected to the same measurement of the attenuation (dB) of the intensity of electric field (dB) as in Example 1, so that the electric field shielding effect of the sample was assessed. The results are shown in Table 1.

EXAMPLE 4

Polymer Complex Preparation Example 3 was repeated except that the Nesa glass plate employed in the same manner as in Polymer Complex Preparation Example 3 was replaced by a Nesa glass plate having grooves, so that a pyrrole polymer complex film having grooves as shown by reference numeral 3 in FIG. 2 was prepared.

Example 1 was then repeated except that the pyrrole polymer complex film employed in Example 1 was replaced by the above-mentioned pyrrole polymer complex film having a thickness of 45 μm (0.31) g/cm$^2$ prepared in Polymer Complex Preparation Example 3, so that an electromagnetic shielding material sample No. 4 according to the present invention was prepared.

The electromagnetic shielding material sample No. 4 was subjected to the same measurement of the attenuation (dB) of the intensity of electric field as in Example 1, so that the electric field shielding effect of the sample was assessed. The results are shown in Table 1.

EXAMPLE 5

Example 3 was repeated except that a protective layer having a thickness of 1 μm, which was prepared by blending acrylpolyol (OH-value 50) and isocyanate serving as setting agent for the acrylpolyol, was further formed on a pyrrole polymer complex film having a thickness of 45 μm (0.33 g/cm$^2$) prepared in Polymer Complex Preparation Example 3, so that an electromagnetic shielding material sample No. 5 according to the present invention was prepared.

The electromagnetic shielding material sample No. 5 was subjected to the same measurement of the attenuation (dB) of the intensity of electric field as in Example 1, so that the electric field shielding effect of the sample was assessed. The results are shown in Table 1.

EXAMPLE 6

The pyrrole polymer complex layer having a thickness of 150 μm prepared in Complex Polymer Preparation Example 4 was directly fixed to the same acrylic resin plate as that employed in Example 1 by use of an electroconductive metal tape, so that an electromagnetic shielding material sample No. 6 according to the present invention was prepared.

The electromagnetic shielding material sample No. 6 was subjected to the same measurement of the attenuation (dB) of the intensity of electric field as in Example 1, so that the electric field shielding effect of the sample was assessed. The results are shown in Table 1.

COMPARATIVE EXAMPLE 1

An electroconductive copper-acryl paint was coated with a thickness of about 35 μm (0.31 g/cm$^2$) on an acrylic resin plate having a size of 150 mm×150 mm and a thickness of 2 mm, whereby a comparative electromagnetic shielding material sample No. 1 was prepared.

This comparative sample was subjected to the same measurement of the attenuation (dB) of the intensity of electric field as in Example 1, so that the electric field shielding effect of the sample was assessed. The results are shown in Table 1.

COMPARATIVE EXAMPLE 2

An electroconductive nickel-acryl paint was coated with a thickness of about 61 μm (0.52 g/cm$^2$) on an acrylic resin plate having a size of 150 mm×150 mm and a thickness of 2 mm, whereby a comparative electromagnetic shielding material sample No. 2 was prepared.

This comparative sample was subjected to the same measurement of the attenuation (dB) of the intensity of electric field as in Example 1, so that the electric field shielding effect of the sample was assessed. The results are shown in Table 1.

COMPARATIVE EXAMPLE 3

An electroconductive adhesive tape (Scotch Tape 1267 made by 3M Co.) consisting of an Al-foil (having a thickness of about 90 μm) and an adhesive agent applied thereto (1.02 g/cm$^2$) was applied to an acrylic resin plate having a size of 150 mm×150 mm and a thickness of 2 mm, whereby a comparative electromagnetic shielding material sample No. 3 was prepared.

This comparative sample was subjected to the same measurement of the attenuation (dB) of the intensity of electric field as in Example 1, so that the electric field shielding effect of the sample was assessed. The results are shown in Table 1.

COMPARATIVE EXAMPLE 4

Example 1 was repeated except that the pyrrole polymer complex film employed in Example 1 was replaced by the pyrrole polymer complex film having a thickness of 50 μm prepared in Comparative Preparation Example 3, whereby a comparative electromagnetic shielding material sample No. 4 was prepared.

The comparative electromagnetic shielding material sample No. 4 was subjected to the same measurement of the attenuation (dB) of the intensity of electric field as in Example 1, so that the electric field shielding effect of the sample was assessed. The results are shown in Table 1.

TABLE 1

|  | 30 MHz | 100 MHz | 200 MHz | 300 MHz | Weight (g/cm$^2$) |
|---|---|---|---|---|---|
| Example 1 | 56 dB | 42 dB | 37 dB | 31 dB | 0.34 |
| Example 2 | 52 dB | 39 dB | 31 dB | 26 dB | 0.16 |
| Example 3 | 65 dB | 53 dB | 35 dB | 30 dB | 0.31 |
| Example 4 | 63 dB | 55 dB | 41 dB | 35 dB | 0.31 |
| Example 5 | 55 dB | 41 dB | 35 dB | 30 dB | 0.31 |
| Example 6 | 75 dB | 63 dB | 48 dB | 41 dB | 0.96 |
| Comp. Example 1 | 22 dB | 15 dB | 10 dB | 10 dB | 0.31 |
| Comp. Example 2 | 40 dB | 33 dB | 30 dB | 25 dB | 0.52 |
| Comp. Example 3 | 50 dB | 45 dB | 42 dB | 38 dB | 1.02 |
| Comp. Example 4 | 50 dB | 37 dB | 30 dB | 29 dB | 0.33 |

As can be seen from the above results, the electromagnetic shielding materials according to the present invention are are much better in the electric field shielding effect than Comparative Examples 1 and 2.

As to Comparative Example 3, the shielding effect is as good as that of the electromagnetic shielding materials according to the present invention. However, its weight is much greater than that of the shielding materials according to the present invention. Therefore, it is not suitable for use in practice.

As to Comparative Example 4, the shielding effect is almost equal to that of Example 1. However, the tensile strength is as small as 3,000 psi in comparison with the tensile strength of 10,500 psi of Example 1. This shielding material cannot be used in practice.

To show the surprising properties obtained with materials containing at least 27% dopant, the inventors prepared various polymers in accordance with the process described in column 6, lines 25 through 45 of Naarman et al (U.S. Pat. No. 4,569,734) under the following conditions:

COMPARATIVE EXAMPLES 5, 6, 8 AND 9

| Acetonitrile | 185 ml |
|---|---|
| Water | 185 ml |
| Pyrrole | 0.5 mol |
| Conductive Salt | 0.1 mol |
| Current Density | 4 mA/cm$^2$ |

COMPARATIVE EXAMPLE 7

| Water | 370 ml |
|---|---|
| Pyrrole | 1.84 g |
| Conductive Salt | 3.5 g |
| Current Density | 7.5 mA/cm$^2$ |

COMPARATIVE EXAMPLE 10

| Acetronitrile | 370 ml |
|---|---|
| Pyrrole | 0.5 mol |
| Conductive Salt | 0.1 mol |
| Current Density | 2 mA/cm$^2$ |

The results are shown in Table 2.

TABLE 2

| Conductive Salt | Content of Dopant (%) | Tensile Strength (psi) | Electric Conductivity (S/cm) | Bulk Density (g/ml) | Uniformity |
|---|---|---|---|---|---|
| 1.  HO—C$_6$H$_4$—SO$_3^\ominus$.Na$^\oplus$ | — | 3100 | 8 | — | D |
| 2.  C$_6$H$_5$—SO$_3^\ominus$.Na$^\oplus$ | — | — | 1.3 | — | D |
| 3.  naphthalene-SO$_3^\ominus$Na$^\oplus$ | 24 | 4200 | 33 | — | C |
| 4.  naphthalene-SO$_3^\ominus$Na$^\oplus$ | 25.5 | 4800 | 13 | 0.45 | C ~ D |
| 5.  H$_3$C—C$_6$H$_4$—SO$_3^\ominus$.Na$^\oplus$ (water) | 28.6 | 5200 | 28 | 0.37 | B ~ C |
| 6.  H$_3$C—C$_6$H$_4$—SO$_3^\ominus$.Na$^\oplus$ | 34.1 | 7700 | 91 | 1.26 | A |

TABLE 2-continued

| Conductive Salt | Content of Dopant (%) | Tensile Strength (psi) | Electric Conductivity (S/cm) | Bulk Density (g/ml) | Uniformity |
| --- | --- | --- | --- | --- | --- |
| (free from water) | | | | | |

In Table 2, the term "uniformity" means the smoothness of the surface to the prepared polypyrrole film. The mark "A" indicates the highest uniformity free from cracks and the mark "D" indicates the lowest uniformity with numerous cracks on the surface thereof. The mark "B" is better than the mark "C" and they are between the mark "A" and "D". The polypyrrole film with the mark "B" or "C" has a cracked surface in a comparatively large area.

The results shown in Table 1 indicate that when the content of the dopant was 34.1%, high tensile strength, high electrical conductivity and high bulk density can be obtained, which are sufficient for use in practice as an electromagnetic shielding material.

In order to investigate the relationship between the doping ratio and the tensile strength of the poly-pyrrole film formed in more detail, Polymer Complex Preparation Example 2 described above was repeated except that the doping amount was decreased to 36%, 27%, 10% and 0%, by gradually decreasing the electric current density below 0.8 mA/cm$^2$.

The results are shown in the following Table 3.

| Doping Ratio | Tensile Strength |
| --- | --- |
| 36% | 6500 psi |
| 27% | 3500 psi |
| 10% | 1000 psi |
| 0% | 400 psi |

As can be seen from the above, when the doping amount is decreased to 27% or below, the tensile strength drastically decreases so that such a polypyrrole film having a doping ratio of less than about 27%, preferably 30% is not suitable for use in practice, since at least 5000 psi is necessary for use in practice.

Figure 6:
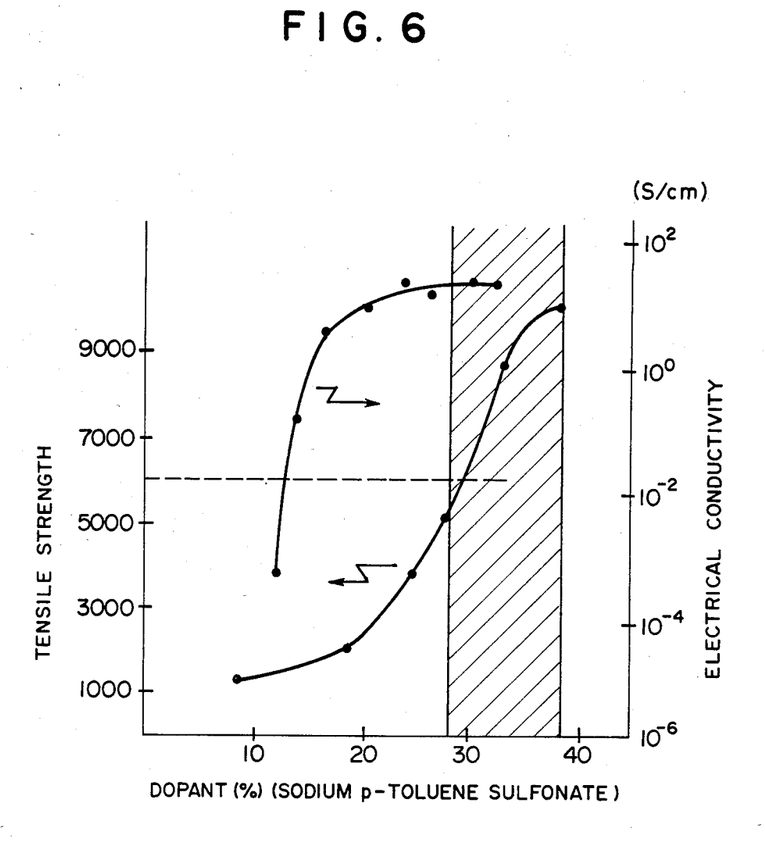
FIG. 6 illustrates (i) the relationship between doping ratio and tensile strength and (ii) the relationship between the dopant ratio and electrical conductivity for the polypyrrole film of the present invention. The dopant in this case was sodium p-toluene sulfonate.

FIG. 6 shows (i) the relationship between the doping ratio and the tensile strength and (ii) the relationship between the dopant ratio and the electrical conductivity of the polypyrrole films. The shaded area shown in FIG. 6 indicates the range of the doping ratio suitable for obtaining a practically usable electromagnetic shielding material.

Recently polypyrroles have attracted attention as a material for electrodes of cells. The pyrrole complex polymer for use in the present invention can be used as a material for pyrrole complex polymer does not easily release the dopant in an electro-chemical system, so that it is capable of maintaining a stable metallic state.

The degree of close contact of an active material of a cell with a current collector of the cell has a significant effect on the function of the cell. A laboratory test conducted by the inventors of the present invention showed that in a prototype battery prepared by use of the pyrrole polymer complex (service as current collector) as an electrode, on which an active material was formed by electrolytic synthesis, the current density in the cell is significantly improved.

In a cell system from which its outer frame was eliminated, using the above current collector as anode only, the energy density was in fact increased by 5 to 15% as compared with a cell using a metallic current collector. Therefore, the pyrrole polymer complex is excellent for use as the material of the current collector of a lightweight, thin-type cell.

What is claimed is:

1. An electromagnetic shielding material comprising an electromagnetic shielding layer which comprises a pyrrole polymer complex comprising (i) repeated pyrrole or pyrrole derivative monomer units which constitute the main chain of the polymer complex and (ii) aromatic anions bonded to the main chain, wherein the ratio of monomer units to anion units is about 3:1 and the dopant amount is between 27% and 40%.

2. An electromagnetic shielding material as claimed in claim 1, wherein said electromagnetic shielding layer has a thickness of 20 m or more.

3. An electromagnetic shielding material as claimed in claim 1, wherein said aromatic anion is selected from the group consisting of anions of p-toluenesulfonic acid, o-toluenesulfonic acid, m-toluenesulfonic acid, benzenesulfonic acid, m-nitrobenzenesulfonic acid and p-nitrobenzenesulfonic acid.

4. An electromagnetic shielding material as claimed in claim 1, wherein said pyrrole polymer complex is prepared by electro-chemical polymerization, with an electric current being causing to flow in the course of the electrochemical polymerization, in the presence of electrolytes comprising said aromatic anion and a cation.

5. An electromagnetic shielding material as claimed in claim 4, wherein said electric current is not more than 5.0 mA.

6. An electromagnetic shielding material as claimed in claim 4, wherein said cation is selected from the group consisting of alkali metal cations, ammonium cation and hydrogen cation.

7. An electromagnetic shielding material as claimed in claim 1, further comprising an adhesive layer containing an adhesive agent attached to said electromagnetic shielding layer and a disposable backing sheet attached to said adhesive layer which can be peeled off said adhesive layer when said electromagnetic shielding material is used.

8. An electromagnetic shielding material as claimed in claim 7, wherein said adhesive layer further comprises a finely-divided electroconductive filler.

9. An electromagnetic shielding material as claimed in claim 7, further comprising a protective layer formed on said electromagnetic shielding layer.

10. The electromagnetic shielding material of claim 1, wherein the dopant amount is between 30% and 40%.

* * * * *

UNITED STATES PATENT AND TRADEMARK OFFICE
CERTIFICATE OF CORRECTION

PATENT NO. : 4,804,568

DATED : Feb 14, 1989

INVENTOR(S) : Toshiyuki OHSAWA, et al

It is certified that error appears in the above-identified patent and that said Letters Patent is hereby corrected as shown below:

On the Title Page, Item [75], the second inventor's name has been reversed. It should read:

--Katsumi YOSHINO--

Signed and Sealed this

Fifteenth Day of May, 1990

Attest:

HARRY F. MANBECK, JR.

Attesting Officer

Commissioner of Patents and Trademarks